United States Patent
Perry et al.

(10) Patent No.: US 6,896,818 B2
(45) Date of Patent: May 24, 2005

(54) WATER FILTRATION AND RECYCLING FOR STONE FABRICATION EQUIPMENT

(75) Inventors: Ross E. Perry, Exeter, NH (US); Paula K. Perry, Exeter, NH (US)

(73) Assignee: PKP Revocable Trust, Portsmouth, NH (US)

(*) Notice: Subject to any disclaimer, the term of this patent is extended or adjusted under 35 U.S.C. 154(b) by 40 days.

(21) Appl. No.: 10/650,187

(22) Filed: Aug. 28, 2003

(65) Prior Publication Data

US 2005/0045565 A1 Mar. 3, 2005

(51) Int. Cl.[7] .......................... B01D 25/12; B01D 37/02
(52) U.S. Cl. .................. 210/744; 210/777; 210/791; 210/805; 210/97; 210/195.1; 210/351; 210/488
(58) Field of Search ................ 210/744, 777, 210/791, 805, 97, 194, 195.1, 251, 351, 416.1, 488; 451/65

(56) References Cited

U.S. PATENT DOCUMENTS

| | | | | |
|---|---|---|---|---|
| 2,594,518 A | * | 4/1952 | Teale | 210/231 |
| 4,597,868 A | * | 7/1986 | Watanabe | 210/232 |
| 5,013,461 A | * | 5/1991 | Drori | 210/777 |
| 5,106,493 A | * | 4/1992 | McIntosh | 210/100 |
| 5,409,616 A | * | 4/1995 | Garbutt et al. | 210/760 |
| 5,447,642 A | * | 9/1995 | Schenach | 210/774 |
| 6,428,709 B1 | * | 8/2002 | Tsuihiji et al. | 210/739 |

FOREIGN PATENT DOCUMENTS

| | | | |
|---|---|---|---|
| JP | 06-170835 A | * | 6/1994 |
| JP | 08-187726 A | * | 7/1996 |
| WO | WO 200162362 A1 | * | 8/2001 |

* cited by examiner

*Primary Examiner*—Frank M. Lawrence
(74) *Attorney, Agent, or Firm*—Davis & Bujold, P.L.L.C.

(57) ABSTRACT

A water treatment and recycling system to provide grey water and crystal clear water to a stone processing system including crystal clear water stone fabrication equipment requiring crystal clear water and grey water stone fabrication equipment capable of using grey water. The system includes a waste water storage tank connected from the waste water discharge ports of the crystal clear water and grey water stone fabrication equipment, a grey water supply loop for pumping waste water from the waste water storage tank as grey water to the grey water stone fabrication equipment and a crystal clear water supply loop for pumping waste water through a high pressure filter to convert the waste water into the crystal clear water, and a crystal clear water supply pump for pumping crystal clear water to crystal clear water stone fabrication equipment. The high pressure filter includes a frame holding a filter stack.

21 Claims, 5 Drawing Sheets

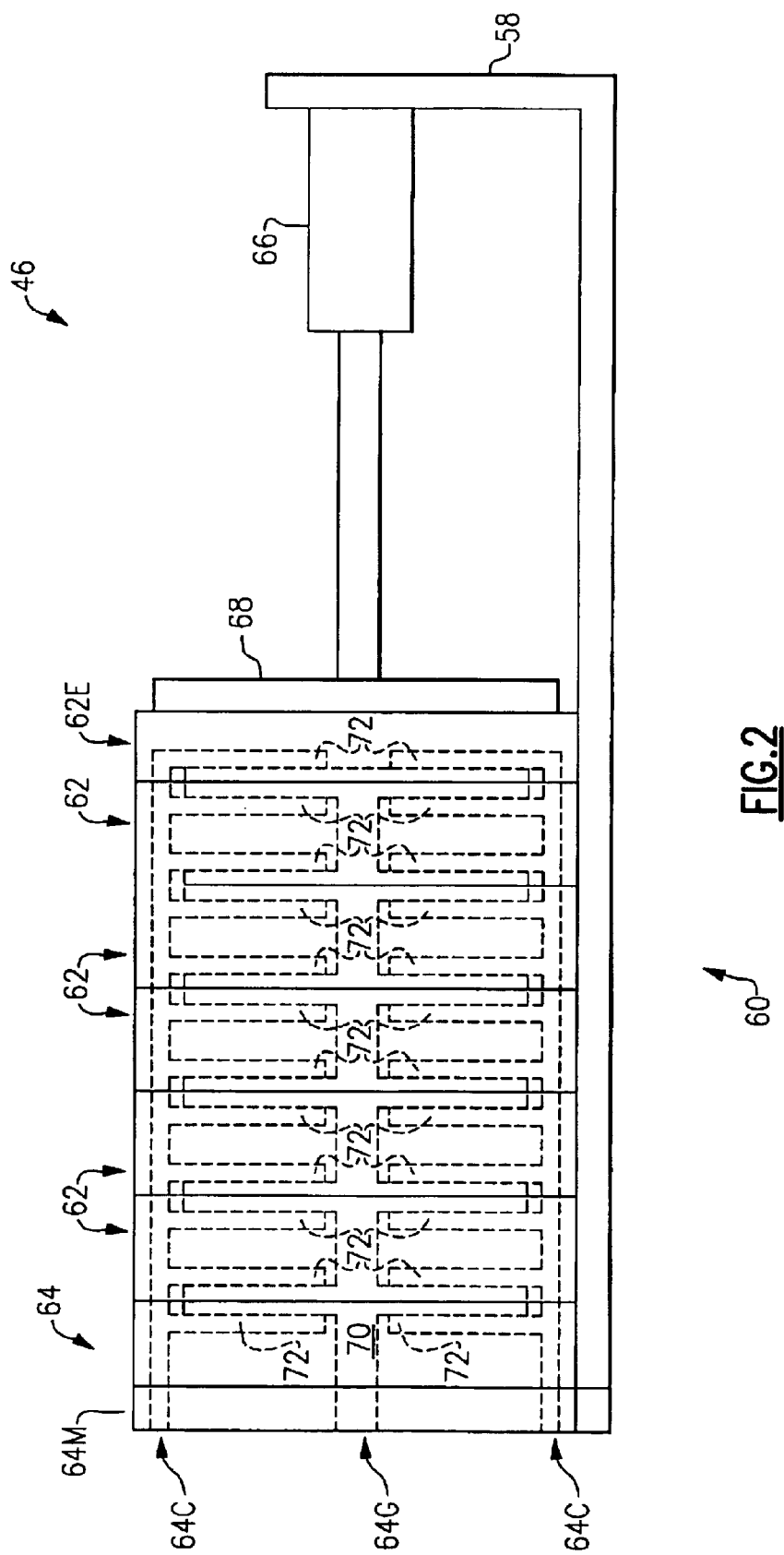

US 6,896,818 B2

WATER FILTRATION AND RECYCLING FOR STONE FABRICATION EQUIPMENT

FIELD OF THE INVENTION

The present invention is directed to a method and system for water treatment and, in particular, to a method and system for filtering particulate matter from a waste water slurry to provide both reusable unfiltered grey water and particulate free "crystal clear" water for processes having differing requirements and, in particular, for stone cutting and polishing processes and including the elimination of any waste water discharge to an on siteseptic facility or a privately owned treatment works (POTW) or a city sewer.

BACKGROUND OF THE INVENTION

Water is employed in a wide range of industrial processes and for a wide range of purposes, each of which imposes its own requirements or characteristics on the properties of the water entering and discharged by the process. Such requirements on the properties or characteristics of water used in or discharges from various processes in turn often result in water treatment processes necessary to make the water suitable or acceptable for use in or discharge from the process, and the various water treatment processes in themselves may be a major technical or economic component of an industrial process.

Various industrial processes can impose a number of chemical and physical requirements on incoming water, such as acidity, salinity, temperature and so on, and corresponding requirements on discharge water, typically to meet environmental or health requirements. In many commonly found industrial processes, however, the principle requirements for input and discharge water concern the particulate or suspended contents of the water rather than, for example, the chemical or dissolved contents of the water.

Examples of processes in which the physical or mechanical contents of the intake and discharge water are the primary concern are found in the stone fabrication industry, such as those involved in cutting, shaping and polishing natural and man-made stone for such products as countertops, flooring, architectural paneling, and so on. As is well known by those of ordinary skill in these arts, water is commonly used to wash away the particulate waste material from the cutting and polishing processes, as a coolant to carry off heat produced by the processes, and often as a lubricant. As a consequence, stone cutting and polishing processes, whether of natural stone or man-made stone-like materials, generate heat and significant volumes of particulate waste material, both of which are carried away in and by the process discharge water. The discharge water is consequently referred to as "grey" water, because of the particulate waste material in the water. The particulate water material is primarily comprised of the material being cut or polished, but will often include other particulate material, such as particles from the cutting and polishing tools themselves and polishing or cutting compounds used with the tools and processes.

The type and degree of treatment performed on the grey discharge water from the processes depends, in turn, on what is done with the discharge water. For example, the grey water is eventually discharged from the processes and the treatment of the grey water before final discharge may be dictated by environmental or health factors. In some instances, the grey water may be treated in no more than a "settling tank" to allow at least some of the particulate waste to "settle out" as sediment before the water is returned, for example, to a river or discharged to enter the groundwater. In addition, water discharged into rivers, streams, groundwater and so on is required to meet state and federal requirements, which typically require ongoing random testing of the discharged water. In most instances, environmental or health concerns may require removal of the particulate waste to the level of "crystal clear" water, as discussed below, before it is returned to the environment or original source.

In still other instances, at least some of the grey water may be recycled to the processes as intake water, thereby reducing to total water volume requirements of the processes. The treatment of recycled grey water will depend, however, upon the uses to which the grey water is to be put. For example, certain processes, and in particular stone cutting, drilling and cooling processes, may use grey water containing a significant amount of particulate waste as the particulate waste from a previous cycle through a stone cutting or polishing and Computer Numeric Controlled (CNC) process will not adversely effect a cutting, drilling, cooling or coarse grinding process. In such instances, the recycled grey water may require no more than a settling tank to allow sedimentation of enough of the particulate waste material that the remaining waste material does not "clog" the ensuing process in which it is used, or may require no treatment at all.

In other instances, however, the process or processes receiving recycled water require "crystal clear" water, that is, water in which the volume and size of particulate matter is strictly limited. Stone polishing and CNC processes, for example, must use intake water that is "crystal clear", that is, water that generally contains no particulate matter, except particles that are generally less than 2 microns in diameter, as larger particulate matter will interfere with the polishing or CNC process by making and leaving scratches that will prevent the desired degree of polish or finish, that may leave visible scratches and that may clog the polishing tools and CNC spindle.

The recycling of grey water into "crystal clear" water, however, is a technically and economically more complex and expensive process than a sedimentation tank as used to recycle grey discharged water to grey intake water for such processes as cutting, drilling, cooling and coarse grinding, and the choice is subject to many factors. For example, it may be less expensive to provide fresh intake water for those processes requiring "crystal clear" water, and to treat all discharge water as grey water for both discharge and recycling purposes. In the alternative, however, and very often, the required quantities of fresh intake water, or intake water of sufficient quality, may not be available or may be more costly than cleaning and recycling grey water into crystal clear water, or the volume of grey water that may be discharged may be limited for any of a number of reasons.

The problem, therefore, is to provide an environmental water discharge system for industrial processes such as stone cutting, grinding, cooling, polishing and for CNC equipments that reduces the required volume of fresh intake water and eliminates all grey discharge water by economic and efficient recycling of grey water into crystal clear water in the required quantities.

The present invention addresses and provides a solution for these and other related problems of the prior art.

SUMMARY OF THE INVENTION

The present invention is directed to a water treatment and recycling method and apparatus to provide grey water and crystal clear water to a stone processing system including crystal clear water stone fabrication equipment requiring crystal clear water for operations on stone and grey water stone fabrication stone equipment capable of using grey water in for operations on stone.

The water treatment and recycling system includes a waste water storage tank connected from the waste water discharge ports of the grey water equipment and crystal clear water equipment for receiving and storing the waste water and a grey water supply loop that includes a grey water pump connected from the waste water storage tank for pumping waste water from the waste water storage tank as grey water to an input port of a grey water tool. The system further includes a crystal clear water supply loop that includes an air pump for pumping waste water from the waste water storage tank, a high pressure filter connected from the filter pump for filtering particulate matter from the waste water to convert the waste water into the crystal clear water, a crystal clear water storage tank connected from discharge passages of the high pressure filter for receiving and storing the crystal clear water, and a crystal clear water supply pump connected from the crystal clear water storage tank for pumping crystal clear water from the crystal clear water storage tank and to an input port of a crystal clear water tool.

The water treatment and recycling system may also include a crystal clear water sterilization loop that includes a sterilization device connected from an output port of the crystal clear water supply pump for receiving and sterilizing at least a portion of the crystal clear water stored in the crystal clear water storage tank and connected to an input port of the crystal clear water storage tank for returning the sterilized crystal clear water to the crystal clear water storage tank.

The water treatment and recycling system also includes a plurality of float switches mounted at selected levels in the waste water storage tank and in the crystal clear water storage tank for indicating waste water levels in the waste water storage tank and crystal clear water levels in the crystal clear water storage tank. Control circuits are connected from the float switches in the waste water storage tank and in the crystal clear water storage tank and from a user control panel to provide control outputs to the grey water supply pump, the filter pump and the crystal clear water supply pump for enabling operation of the grey water supply pump, the filter pump and the crystal clear water supply pump dependent on the waste water level in the waste water storage tank and the crystal clear water level in the crystal clear water storage tank.

The high pressure filter of the present invention includes a frame holding a filter stack that includes a manifold plate for connections to a waste water supply and a crystal clear water output, a head plate, a plurality of filter plates, and a tail plate with a ram for applying axial pressure along the filter stack to force the manifold plate, the head plate, the filter plates and the tail plate into a pressure tight assembly. The head plate and each of the filter plates include an axial input bore connecting sequentially along the filter stage to form an axial input passage for receiving waste water from the waste water storage tank and a plurality of discharge bores located circumferentially around the axial input passage to form a corresponding plurality of discharge passages extending along the length of the filter stack, the discharge passages being connected to one another outside of the manifold plate and to the crystal clear water storage tank. Each of the filter plates further include at least one filter chamber for containing and supporting active filter elements, each filter chamber being connected between the axial input passage and each of the plurality of discharge passages and the active filter elements removing particulate matter from the waste water flowing along the input passage to provide the crystal clear water discharged through the discharge passages, and the tail plate being located at the opposite end of the filter stack from the head plate and terminating the input passage and the discharge passages.

According to the present invention, the active filter elements include a filter Media extending across a filter chamber in a flow path between the input passage and the discharge passages communicating with the filter chamber, and a granular filter layer coated upon and supported by the filter Media for removal of particulate matter from the waste water, the granular filter layer being located in the flow path from the input passage to the discharge passages on the input passage side of the filter Media.

Further according to the present invention, each filter plate includes a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

In another aspect, the invention is directed to a high pressure filter for removing particulate matter from waste water from at least one stone processing tool and providing crystal clear water to at least one stone processing tool. The high pressure filter of the present invention includes a filter frame a manifold plate for waster water input to the filter and crystal clear water output from the filter, a filter stack including a head plate, a plurality of filter plates and a tail plate, and a push plate connected from a ram for applying axial pressure along the filter stack to force the head plate, the filter plates and the tail plate into a pressure tight assembly.

The head plate and each of the filter plates include an axial input bore connecting sequentially along the filter stage to form an axial input passage for receiving waste water from the waste water storage tank, and a plurality of discharge bores located circumferentially around the axial input passage to form a corresponding plurality of discharge passages extending along the length of the filter stack, the discharge passages being connected to one another outside of the manifold plate and to the crystal clear water storage tank.

Each of the filter plates include at least one filter chamber for containing and supporting active filter elements, each filter chamber being connected between the axial input passage and each of the plurality of discharge passages and the active filter elements removing particulate matter from the waste water flowing along the input passage to provide the crystal clear water discharged through the discharge passages, and the tail plate is located at the opposite end of the filter stack from the head plate and terminating the input passage and the discharge passages.

According to the present invention, the active filter elements include a filter media extending across a filter chamber in a flow path between the input passage and the discharge passages communicating with the filter chamber, and a granular filter layer coated upon and supported by the filter media for removal of particulate matter from the waste water, the granular filter layer being located in the flow path from the input passage to the discharge passages on the input passage side of the filter media.

Each filter plate further includes a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

In a still further aspect, the present invention includes a method for cleaning the filter stack of accumulated waste particulate matter, comprising the steps of forcing air into the filter stack through a discharge passage to force air to flow through the filter chambers and the active filter elements to and through the input passage to force water from particulate waste matter captured by the active filter elements. The axial pressure on the filter stack is then released to permit separation of the head plate, the filter plates and the tail plate, and the particulate waste matter captured by the active filter elements and a granular filter layer containing the captured particulate waste matter is then scraped from the surface of a filter media and captured particulate waste matter is then flushed from the surface of the filter media by means of a high pressure water hose system. The head plate, the filter plates and the tail plate are then reassembled into a filter stack and the axial pressure on the head plate, the filter plates and the tail plate is restored to force the filter stack into a pressure tight assembly, whereupon crystal clear water is flushed through the filter stack to flush residual waste matter from the discharge passages by forcing crystal clear water into the discharge passages to flow through the filter plates and out the input passage, and the granular filter layer coating is restored to each filter media.

The present invention further includes a method for pre-coating a granular filter layer onto each filter media, comprising the steps of pumping a mixture of crystal clear water and a granular material comprising the granular filter layer into the input passage of the filter stack to flow through each filter Media of each filter plate and through the discharge passages from the filter stack, and recirculating the crystal clear water returned from the discharge passages of the filter stack and replenishing the granular material mixed into the crystal clear water until a desired thickness of the granular material is deposited on the each filter Media of each filter plate.

BRIEF DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

Figure 1:
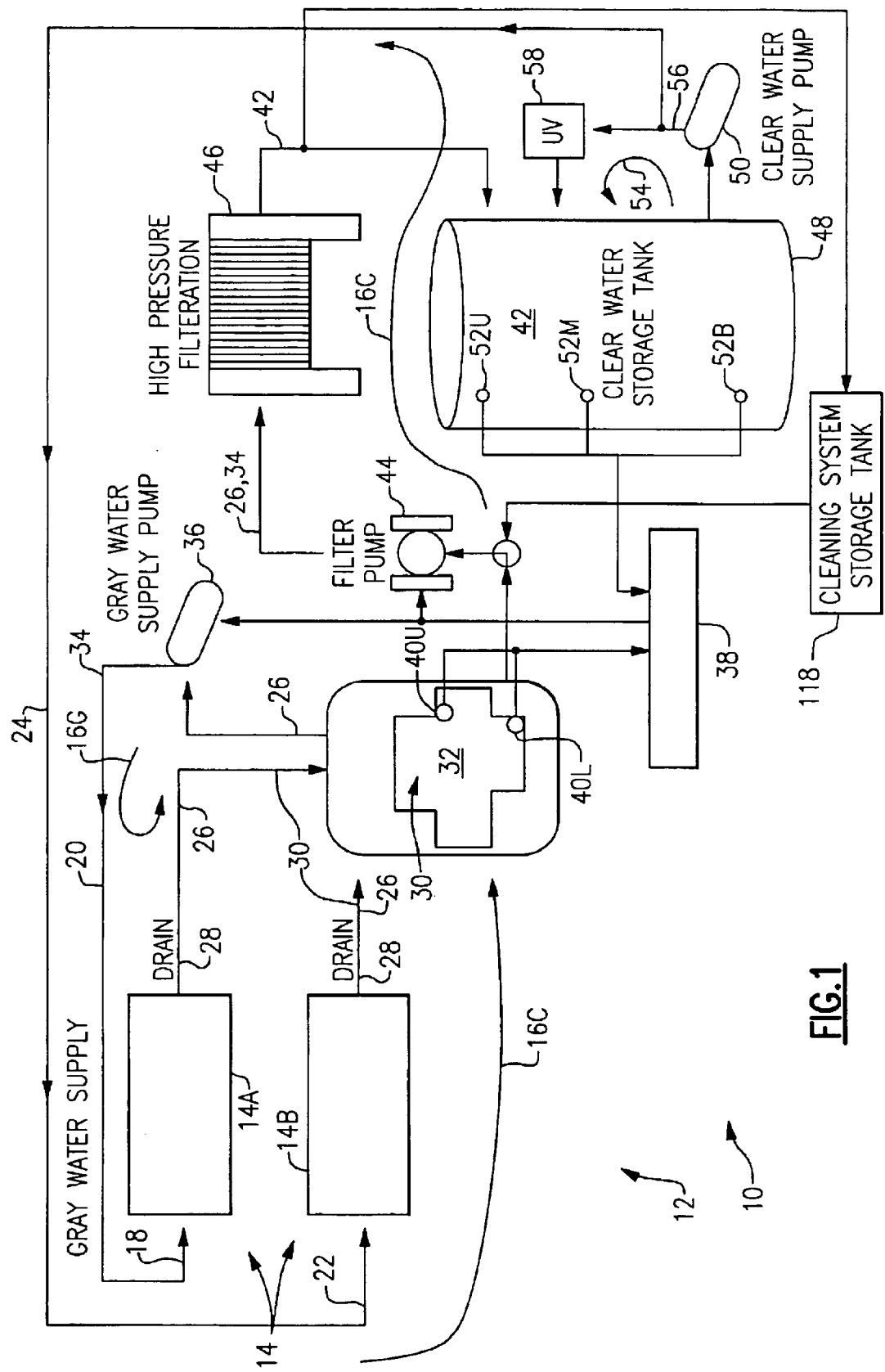
FIG. 1 is a diagrammatic representation of a water processing system of the present invention in association with a stone processing system.

Referring to FIG. 1, therein is shown a diagrammatic representation of a Water Treatment And Recycling System 10 of the present invention in association with a Stone Processing System 12 that includes Stone Processing Tools 14, which will typically include Stone Processing Tools 14A, such as bridge and gantry saws, routers, coarse grinders and cooling functions, that may utilize "grey water" and Stone Processing Tools 14B, such as hand polishers, surface polishers, edge profilers, edge polishers, water jets and CNC Equipment that may require "Crystal Clear Water".

In this regard, and for purposes of the present discussions and invention, "grey water" may be defined as water containing particulate matter that is typically greater than 2 microns in diameter, and that is often significantly larger than 2 microns in diameter, while "crystal clear water" may be defined as water than typically includes only particulate matter less than or equal to 2 microns in diameter.

As shown in FIG. 1, therefore, and according to the present invention, a Water Treatment And Recycling System 10 includes a Grey Water Loop 16G and a Crystal Clear Water Loop 16C, each providing the quality of water required for a given stone processing tool. For this purpose, and as indicated, the Grey Water Intakes 18 of Stone Processing Tools 14A, which can function with grey water, are connected from Grey Water Supply Line 20 of Grey Water Loop 16G while the Crystal Clear Water Intakes 22 of Stone Processing Tools 14B, which require crystal clear water, are connected from Crystal Clear Water Supply Line 24 of Crystal Clear Water Loop 16C.

As may be seen from FIG. 1, Grey Water Loop 16G and Crystal Clear Water Loop 16C share a common waste water discharge path from Stone Processing Tools 14A wherein Waste Water 26 from Waste Water Discharges 28 of Stone Processing Tools 14A and 14B are collected by Waste Water Collection Line 30, which in turn discharges Waste Water 26 into Waste Water Collection Tank 32. Waste Water Collection Tank 32 may be, for example, a pit or a conventional tank, and is a holding reservoir for Waste Water 30 that is to be recycled as grey or crystal clear water. Waste Water Collection Tank 32 may also be a sedimentation facility for the recycling of Waste Water 26 into grey water and crystal clear water, if necessary.

First considering Grey Water Loop 16G, as shown Waste Water 26 is drawn from Waste Water Collection Tank 32 and is pumped onto Grey Water Supply Line 20 as Grey Water 34 by Grey Water Pump 36. In a present embodiment of Water Treatment And Recycling System 10 Grey Water Pump 36 is, for example, a self-priming, electrically powered centrifugal pump delivering Grey Water 34 at, for example, 40 psi and at the volume required by Stone Processing Tools 14A, which will depend upon the specific Stone Processing System 12. As indicated, Grey Water 34 from Grey Water Pump 36 is delivered through Grey Water Supply Line 20 to Grey Water Intakes 18 of Stone Processing Tools 14A, as described above.

As shown, Grey Water Pump 36 is controlled from a conventional Control Panel 38 having the necessary and convention associated control circuits for controlling the operation of Grey Water Pump 36 and the delivery of Grey Water 34 to Stone Processing Tools 14A. For example, the control circuits associated with Grey Water Pump 36 will include a conventional Waste Water Float Sensor/Switch 40 to control the operation of Grey Water Pump 36 dependent upon the level of Waste Water 26 in Waste Water Collection Tank 32.

In particular, Waste Water Float Sensor/Switch 40 prevents Grey Water Pump 36 from operating if the level of Waste Water 26 in Waste Water Collection Tank 32 falls below a preset limit. This grey water cutoff limit is typically determined by the height of the Grey Water Pump 36 intake in Waste Water Collection Tank 32 and is chosen to prevent damage to Grey Water Pump 36 if the level of Waste Water 26 should fall below the level of the Grey Water Pump 36 intake.

Also, when Grey Water Loop 16G is turned on, that is, Grey Water Pump 36 is turned on and enabled by Waste Water Float Sensor/Switch 40, Grey Water Pump 36 will run continuously to maintain the desired pressure in Grey Water Supply Line 20. The continuous operation of Grey Water Pump 36 also insures a continuous flow and recirculation of Grey Water 34 through Waste Water Collection Tank 32 to thereby insure that Waste Water Tank 32 is free from collecting sediments. A manifold or valve may also be connected from the base of Waste Water Collection Tank 32 to allow Waste Water 26 and any sediments accumulated in the base of Waste Water Collection Tank 32 to be flushed from Waste Water Collection Tank 32. The flow of Grey Water 34 is then controlled for each Stone Processing Tool 14A individually by tool water supply control valves associated with the Grey Water Intakes 18 of the individual Stone Processing Tools 14A. Keeping Waste Water Collection Tank 32 free of accumulated sediment thereby also protects Grey Water Pump 36 from "dead heading" in the event that control valves providing Grey Water 34 to Stone Processing Tools 14A are closed.

Crystal Clear Water Loop 16C, like Grey Water Loop 16G, starts at Waste Water Collection Tank 32 where Waste Water 26 that is to be recycled into Crystal Clear Water 42 is drawn from Waste Water Collection Tank 32 by Air Diaphragm Pump 44 and is provided under pressure to High Pressure Filter 46. High Pressure Filter 46, which is described further below, removes from the Waste Water 26 all particulate matter that is 2 microns or greater in diameter, thereby recycling Waste Water 26 into Crystal Clear Water 42, and delivers the Crystal Clear Water 42 into a Crystal Clear Water Storage Tank 48.

In a present embodiment of a Water Treatment And Recycling System 10, Air Diaphragm Pump 44 is driven by air supplied, for example, at a maximum volume of up to 100 scfm and at a maximum pressure of up to 100 psi. The compressed air must be clean, dry air and it will be recognized that the volume and pressure of the air is dependent upon the desired volume of crystal clear water and the resistance offered by High Pressure Filter 46. It will be understood by those of ordinary skill in the relevant arts that the requirements for Air Diaphragm Pump 44 and the air required to drive the pump will thereby be dependent upon the crystal clear water volume requirements of Stone Processing System 12 and that these requirements will vary depending, for example, on the current state and efficiency of High Pressure Filter 46, such as the degree to which the filters therein are clogged by filtered particulate matter. For example, and continuing with the example just described, High Pressure Filter 46 will present approximately 5 psi of backpressure when the filtering apparatus is clean and Air Diaphragm Pump 44 will consume approximately 5 scfm of compressed air. When the filter apparatus in High Pressure Filter 46 is effectively full of particulate matter, High Pressure Filter 46 will present, for example, approximately 80 psi of backpressure and Air Diaphragm Pump 44 will consume approximately 100 scfm of compressed air.

In a present embodiment, Air Diaphragm Pump 44 is controlled from Control Panel 38 and is enabled or disenabled by, for example, Waste Water Float Sensor/Switches 40U and 40L in Waste Water Collection Tank 32, which detects when the level of Waste Water 34 is adequate to supply Crystal Clear Water Storage Tank 48 through Air Diaphragm Pump 44 and when the level of Waste Water 34 in Waste Water Collection Tank 32 has fallen too low, thereby protecting Air Diaphragm Pump 44. In the instance that Waste Water Float Sensor/Switches 40U and 40L float in Waste Water Collection Tank 32, which may be the case when, for example, Waste Water Collection Tank 32 is a pit, Waste Water Float Sensor/Switches 40U and 40L will control only Grey Water Pump 36. Other float sensors in Crystal Clear Water Storage Tank 48, as described below, operate to maintain the necessary flow of water through High Pressure Filter 46 and the necessary levels in Crystal Clear Water Storage Tank 48.

The Crystal Clear Water 42 contained in Crystal Clear Water Storage Tank 48 is drawn from Crystal Clear Water Storage Tank 48 and delivered to Stone Processing Tools 14B through Crystal Clear Water Supply Line 24 by a Crystal Clear Water Supply Pump 50. As in the case of Grey Water Pump 36 and Grey Water Supply Line 20, Crystal Clear Water Supply Pump 50 runs continuously to maintain a desired pressure in Crystal Clear Water Supply Line 24 so long as Crystal Clear Water Supply Pump 50 is turned on from Control Panel 38 and is enabled by float sensors in Crystal Clear Water Storage Tank 48. The flow of Crystal Clear Water 42 to the individual Stone Processing Tools 14B is then controlled by individual crystal dear water control valves located at the Crystal Clear Water Intakes 22 of the individual Stone Processing Tools 14B.

As indicated in FIG. 1, Crystal Clear Water Storage Tank 48 and the control circuits for Crystal Clear Water Supply Pump 50 include a Bottom Float Sensor/Switch 52B, a Middle Float Sensor/Switch 52M and an Upper Float Sensor/Switch 52U, each of which senses and indicates a level or level range of the Crystal Clear Water 42 in Crystal Clear Water Storage Tank 48. For example, Bottom Float Sensor/Switch 52B is located towards the bottom of Crystal Clear Water Storage Tank 48 and functions as a safety switch to protect Crystal Clear Water Supply Pump 50 by insuring that Crystal Clear Water Supply Pump 50 is enabled only when the level of Crystal Clear Water 42 in Crystal Clear Water Storage Tank 48 is at or above the water intake of Crystal Clear Water Supply Pump 50. Upper Float Sensor/Switch 52U, in turn, is located toward the top of Crystal Clear Water Storage Tank 48 and operates to prevent overfilling of Crystal Clear Water Storage Tank 48. Upper Float Sensor/Switch 52U indicates when the Crystal Clear Water Storage Tank 48 is full to maximum safe capacity and turns off Air Diaphragm Pump 44 when this state is reached so that no more Crystal Clear Water 42 is supplied to Crystal Clear Water Storage Tank 48 until the level of Crystal Clear Water 42 therein has decreased below the trip level of Upper Float Sensor/Switch 52U, typically by a flow of Crystal Clear Water 42 to Stone Processing Tools 14B.

Finally, in a present embodiment of a Water Treatment And Recycling System 10 the normal operating range of the level of Crystal Clear Water 42 in Crystal Clear Water Storage Tank 48 is between Upper Float Sensor/Switch 52U and Middle Float Sensor/Switch 52, that is, in the mid-levels of Crystal Clear Water Storage Tank 48 between Upper Float Sensor/Switch 52U and Bottom Float Sensor/Switch 52B. A Middle Float Sensor/Switch 52M is located in these levels to indicate when the level of Crystal Clear Water 42 in Crystal Clear Water Storage Tank 48 is in the normal operating range, which in the present implementation is between Middle Float Sensor/Switch 52M and Upper Float Sensor/Switch 52U. If the level of Crystal Clear Water 42 should fall below the level of Middle Float Sensor/Switch 52M, Middle Float Sensor/Switch 52M will indicate this condition, thus indicating that the operating levels of Crystal Clear Water Storage Tank 48 are falling outside the normal operating range and should be checked and the system adjusted. Middle Float Sensor/Switch 52M thereby provides a visual warning system of a possible undesirable operating trend, that is, that Crystal Clear Water 42 is being used faster than it is being provided from High Pressure Filter 46. Middle Float Sensor/Switch 52M does so by generating a visual and audible warning signal before the output of Crystal Clear Water 42 to Crystal Clear Water Supply Line 24 is cut off when the level of Crystal Clear Water 42 in Crystal Clear Water Storage Tank 48 drops to the point where Bottom Float Sensor/Switch 52B is triggered.

Lastly with regard to Crystal Clear Water Storage Tank 48, it is shown in FIG. 1 that a present embodiment of Crystal Clear Water Loop 16C includes an alternative Sterilization Loop 54 connected from the Crystal Clear Water Output 56 of Crystal Clear Water Supply Pump 50 and through a Sterilizer 58 and back into Crystal Clear Water Storage Tank 48. In the present embodiment of Water Treatment And Recycling System 10, Sterilizer 58 is an ultraviolet disinfection (UV) light that operates to destroy any bacteria that may grow in and contaminate the Crystal Clear Water 42 residing in Crystal Clear Water Storage Tank 48. Because Crystal Clear Water Supply Pump 50 operates continuously to maintain the desired pressure in Crystal Clear Water Supply Line 24 so long as it is enabled by Float Sensor/Switch 52B, as described above, there will be a continuous flow of Crystal Clear Water 42 from Crystal Clear Water Storage Tank 48, through Sterilization Loop 54 and back into Crystal Clear Water Storage Tank 48, thereby continuously disinfecting the Crystal Clear Water 42 therein. Sterilization Loop 54, by running continuously, also provides an escape or relief path for Crystal Clear Water Supply Pump 50 should Crystal Clear Water Loop 16C become "dead headed", such as by the closing of all control valves supplying Stone Processing Tools 14B.

Figure 2:
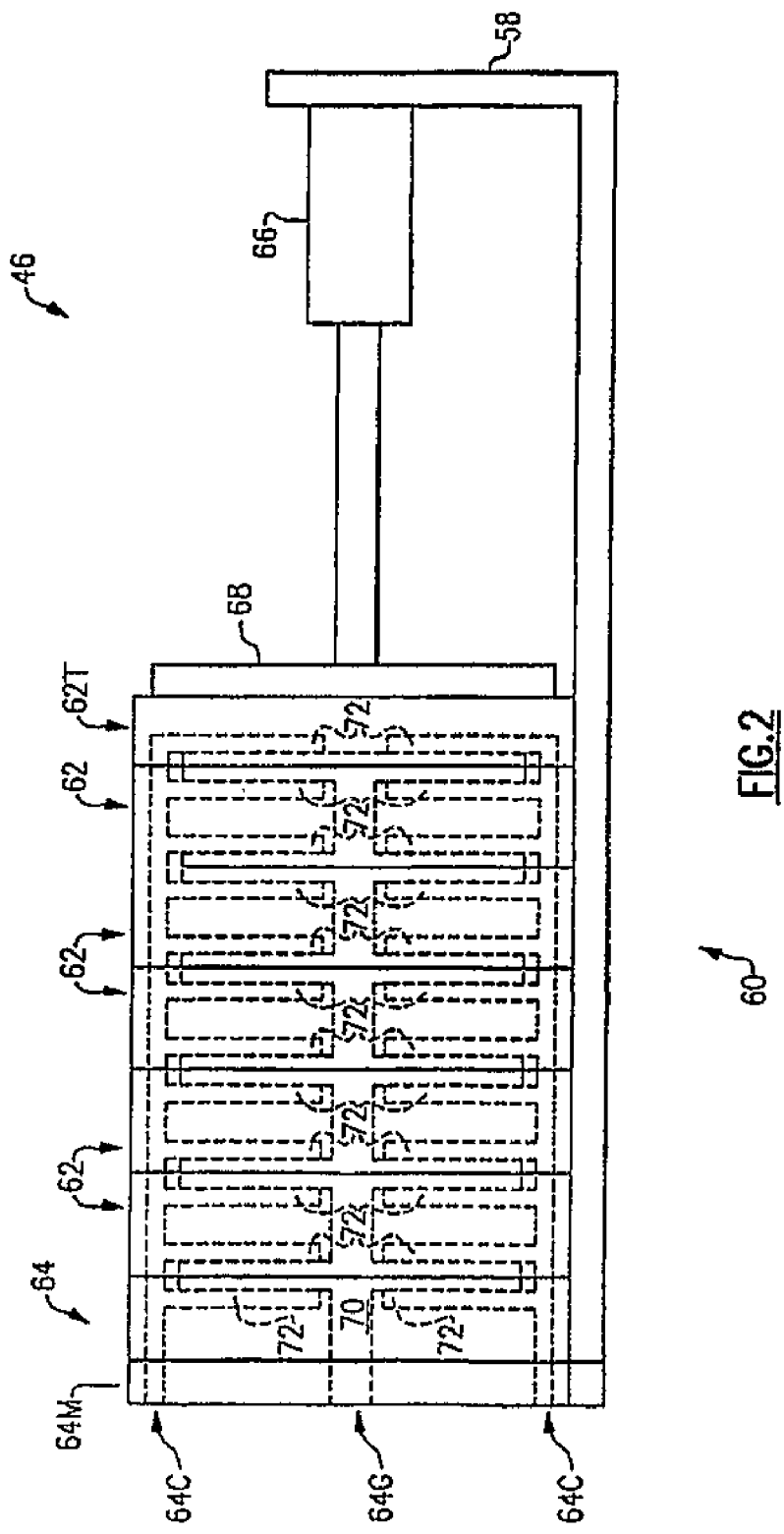
FIG. 2 is a diagrammatic representation of a high pressure filter of the present invention for filtering waste water into clear water.
Figure 3A:
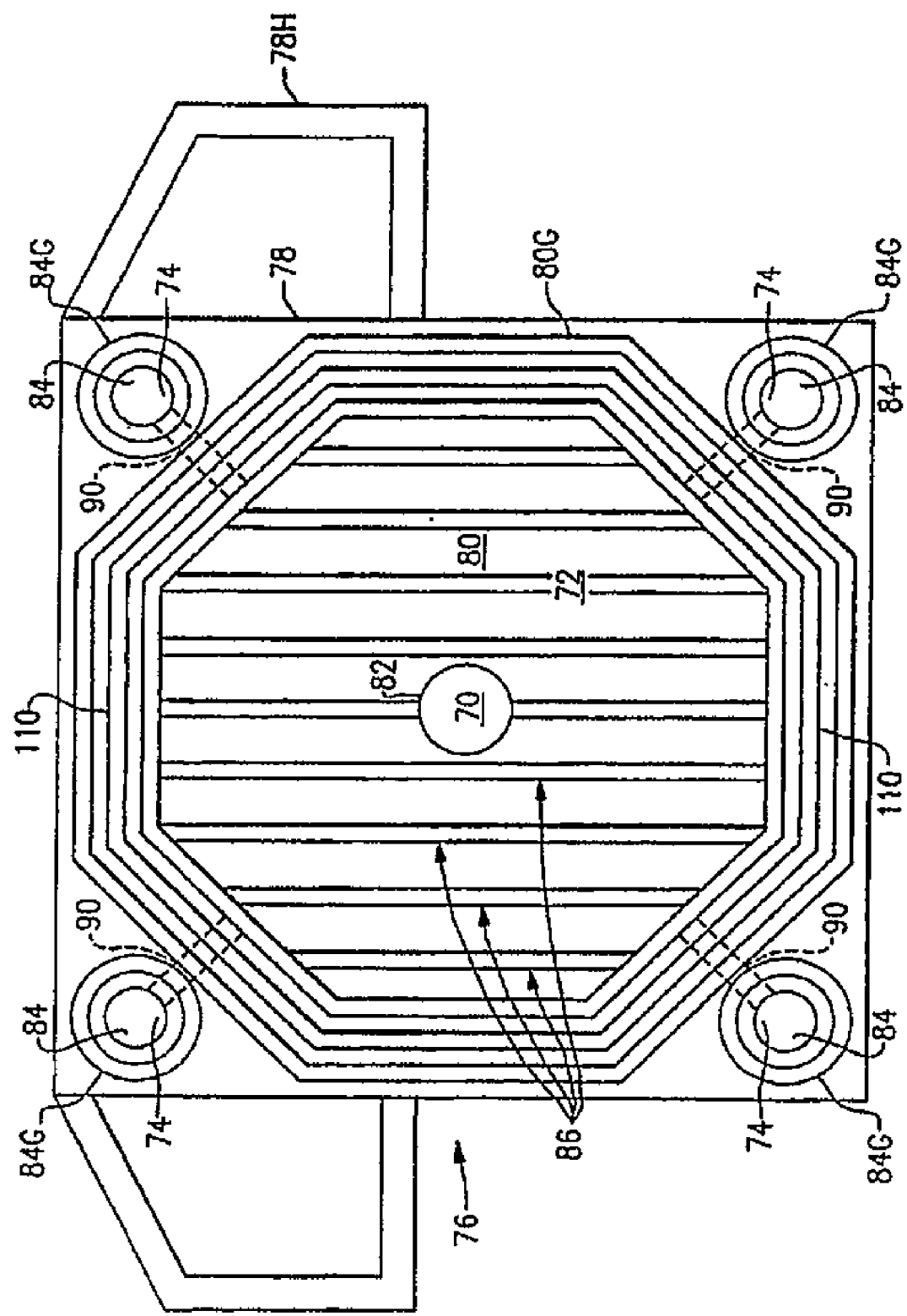
Figure 3B:
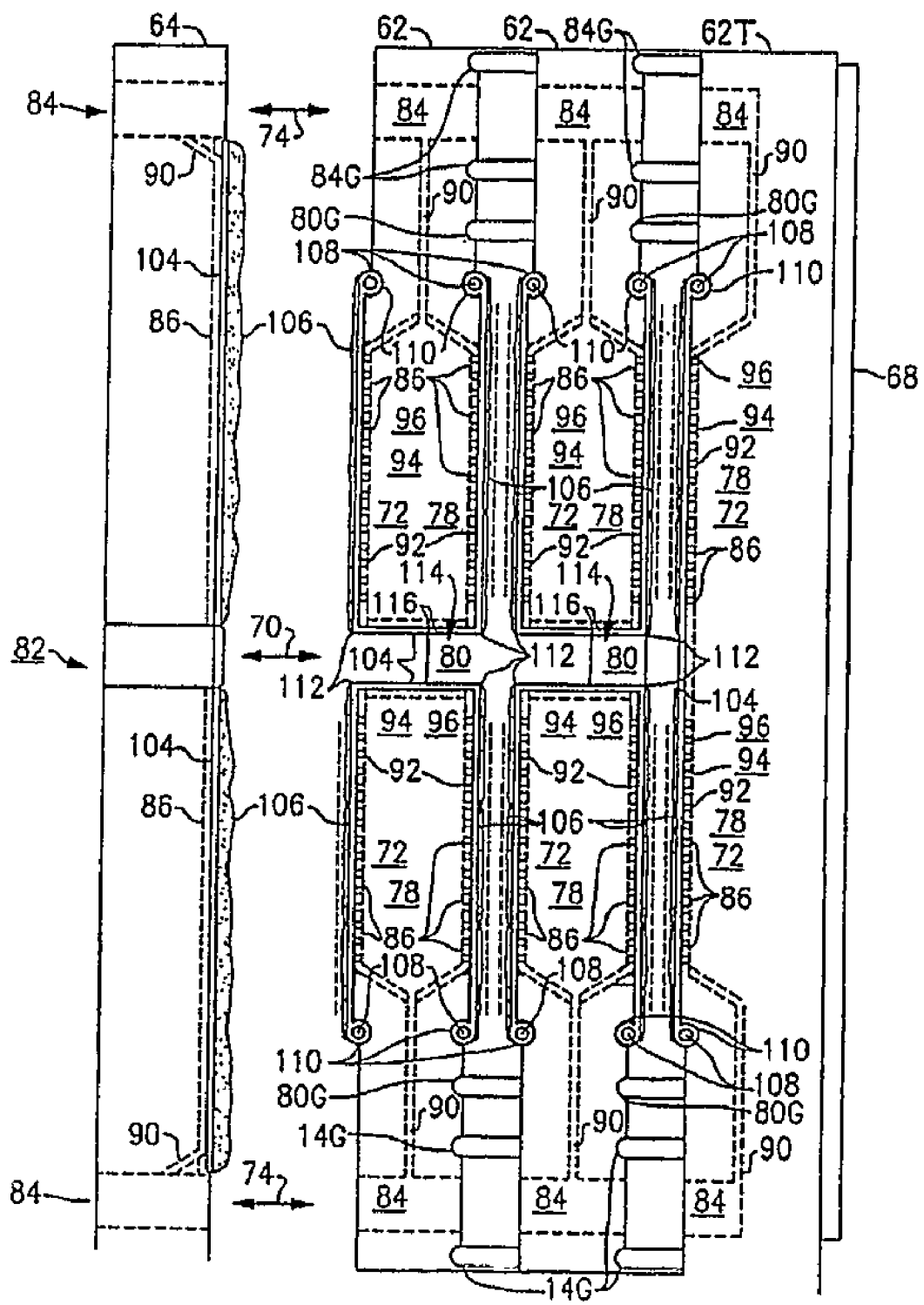

Referring now to FIG. 2, therein is shown a diagrammatic representation of a High Pressure Filter 46. As illustrated therein, and in addition to Air Diaphragm Pump 44, High Pressure Filter 46 includes a Frame 58 holding a Filter Stack 60 comprised of a steel Frame 58 with plumbing mounted to it, a Manifold Plate 64M, a Head Plate 64, a plurality of Filter Plates 62, and a Tail Plate 62T mounted on Frame 58. A Filter Stack 60 includes a Waste Water Input Port 64G through which Waste Water 26 enters Filter Stack 60 and a plurality of Crystal Clear Water Discharge Ports 64C through which Crystal Clear Water 42 is discharged from Filter Stack 60. A Hydraulic Ram 66 mounted to the Frame 58 controllably exerts axial pressure on a Push Plate 68, which in turn exerts axial force on Tail Plate 62T, the Filter Plates 62 and the Head Plate 46 to force Head Plate 64, Filter Plates 62 and Tail Plate 62T into a water and pressure tight Filter Stack 60 against steel Manifold Plate 64M, to which the Waste Water 26 and Crystal Clear Water 42 connections are made.

As illustrated schematically in FIG. 2, and as described further below, Manifold Plate 64M, Head Plate 64 and Filter Plates 62 are constructed to form a central Input Passage 70 axially interconnecting a plurality of Filter Chambers 72 and forming a Waste Water 26 flow path from Waste Water Input Port 64G into Filter Chambers 72. Manifold Plate 64M, Head Plate 64 and Filter Plates 62 are also constructed to form a plurality of axial Discharge Passages 74 that are circumferential to and connected from Filter Chambers 72 to form a Crystal Clear Water 42 flow path from Filter Chambers 72 to corresponding Crystal Clear Water Discharge Ports 64C. Although not shown in detail, it should be noted that as indicated in FIG. 2 Crystal Clear Water Discharge Ports 64C are connected together at the four corner points outside of Manifold Plate 64M to form a single line to Crystal Clear Water Storage Tank 48, and Input Passage 70 and Discharge Passages 74 terminate at Tail Plate 62T.

Figure 3A:
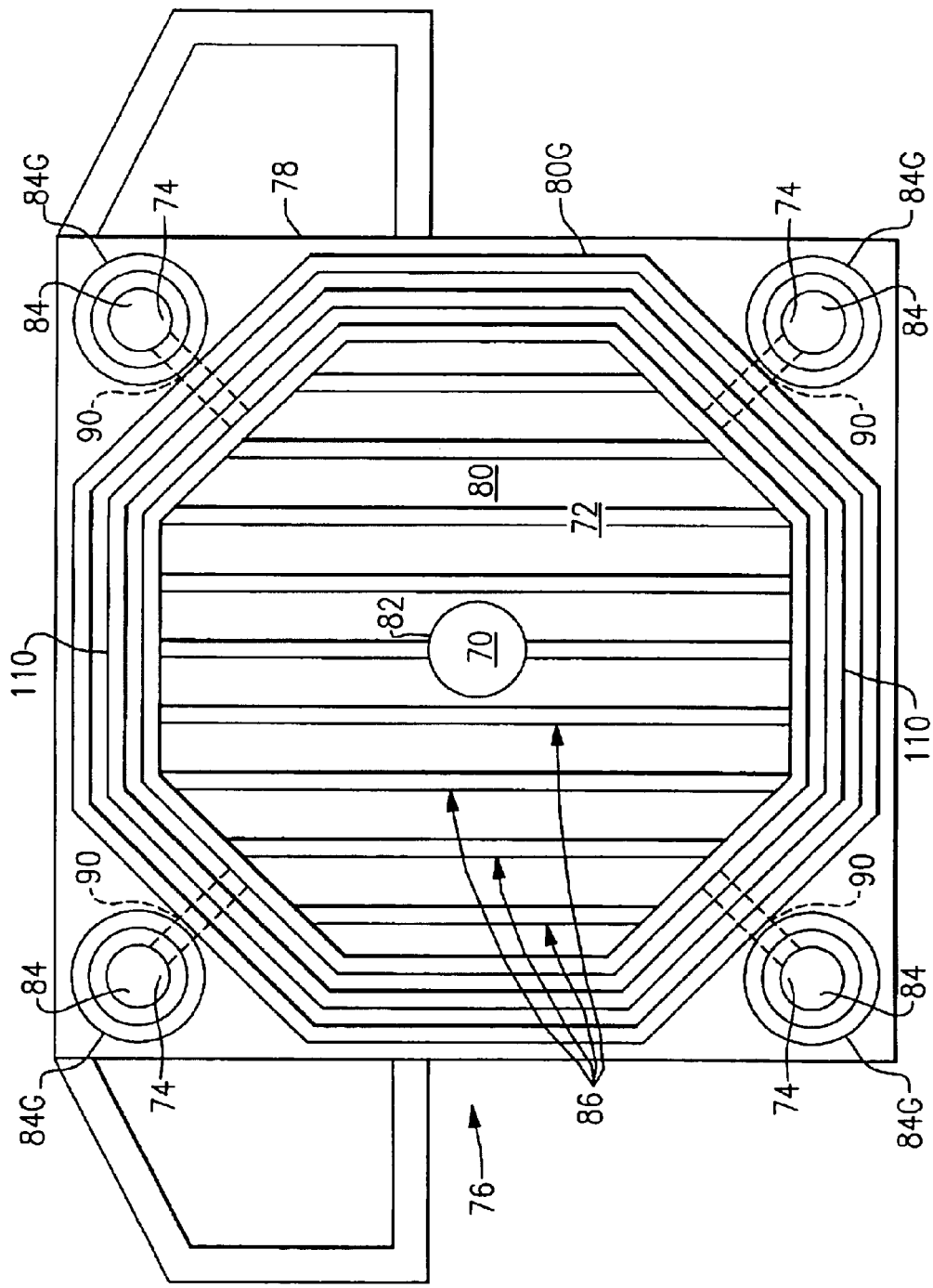
FIG. 3A is a diagrammatic end view of a typical filter plate of the high pressure filter, which also illustrates an end plate and a head plate of the high pressure filter.
Figure 3B:
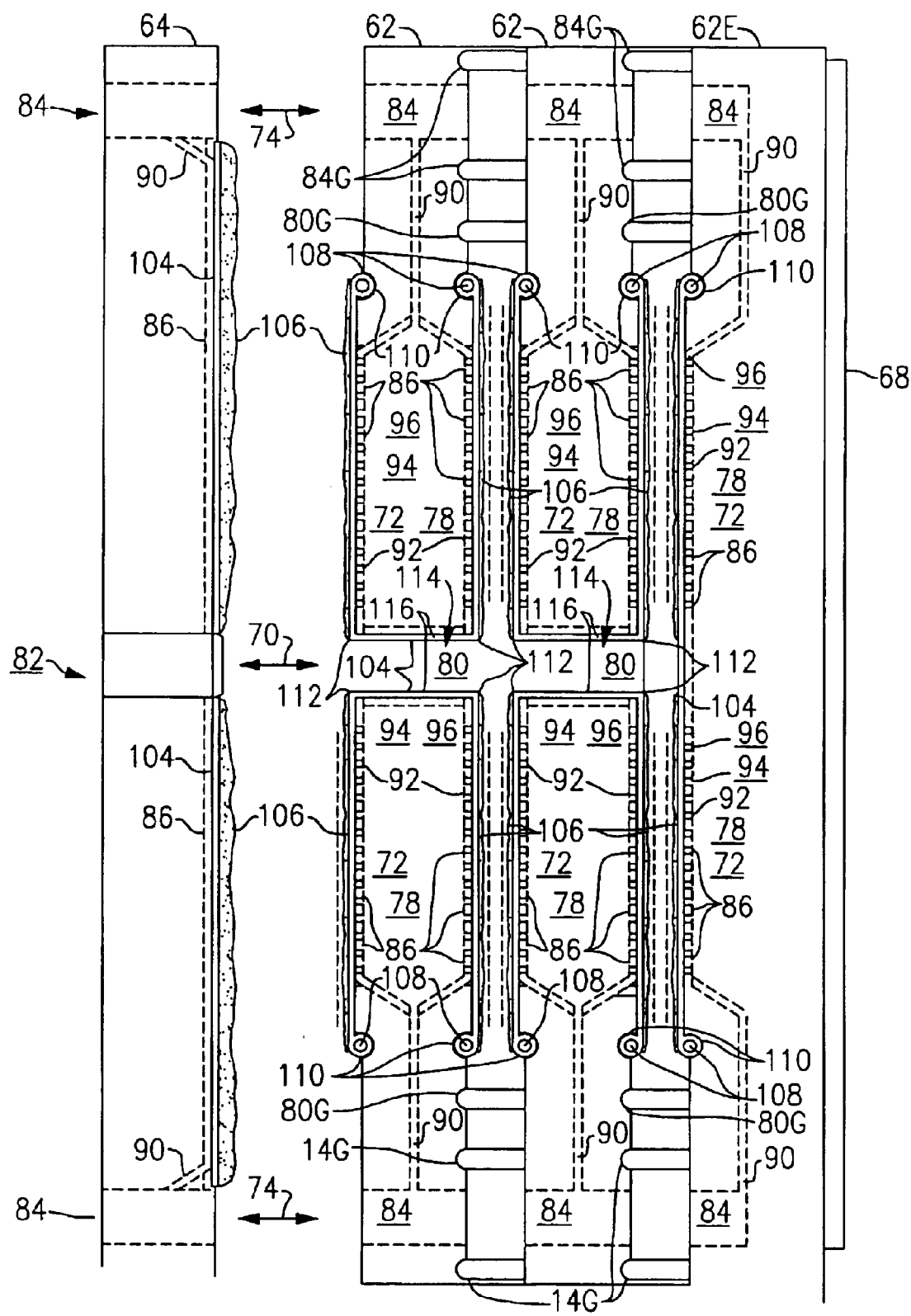
FIG. 3B is a cross section view of a filter stack of a high pressure filter, including a head plate, filter plates and a tail plate; and, FIG. 3C is a cross section of the active filter elements of a high pressure filter for a filter plate having back-to-back filter chambers.
Figure 3C:
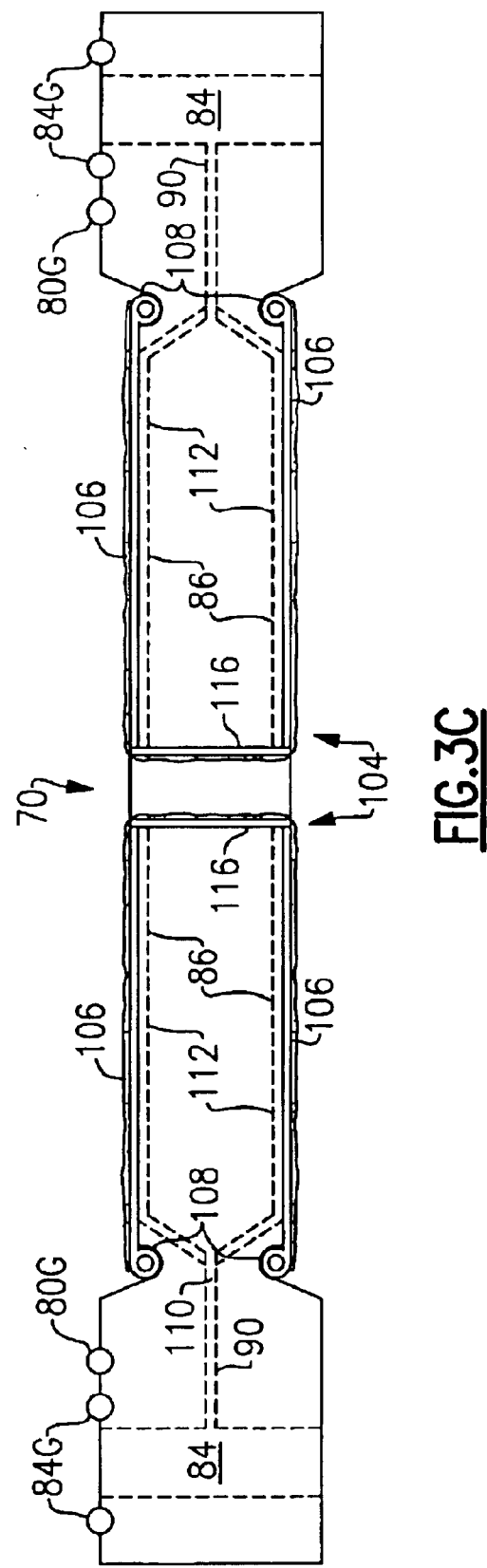
Figure 1:
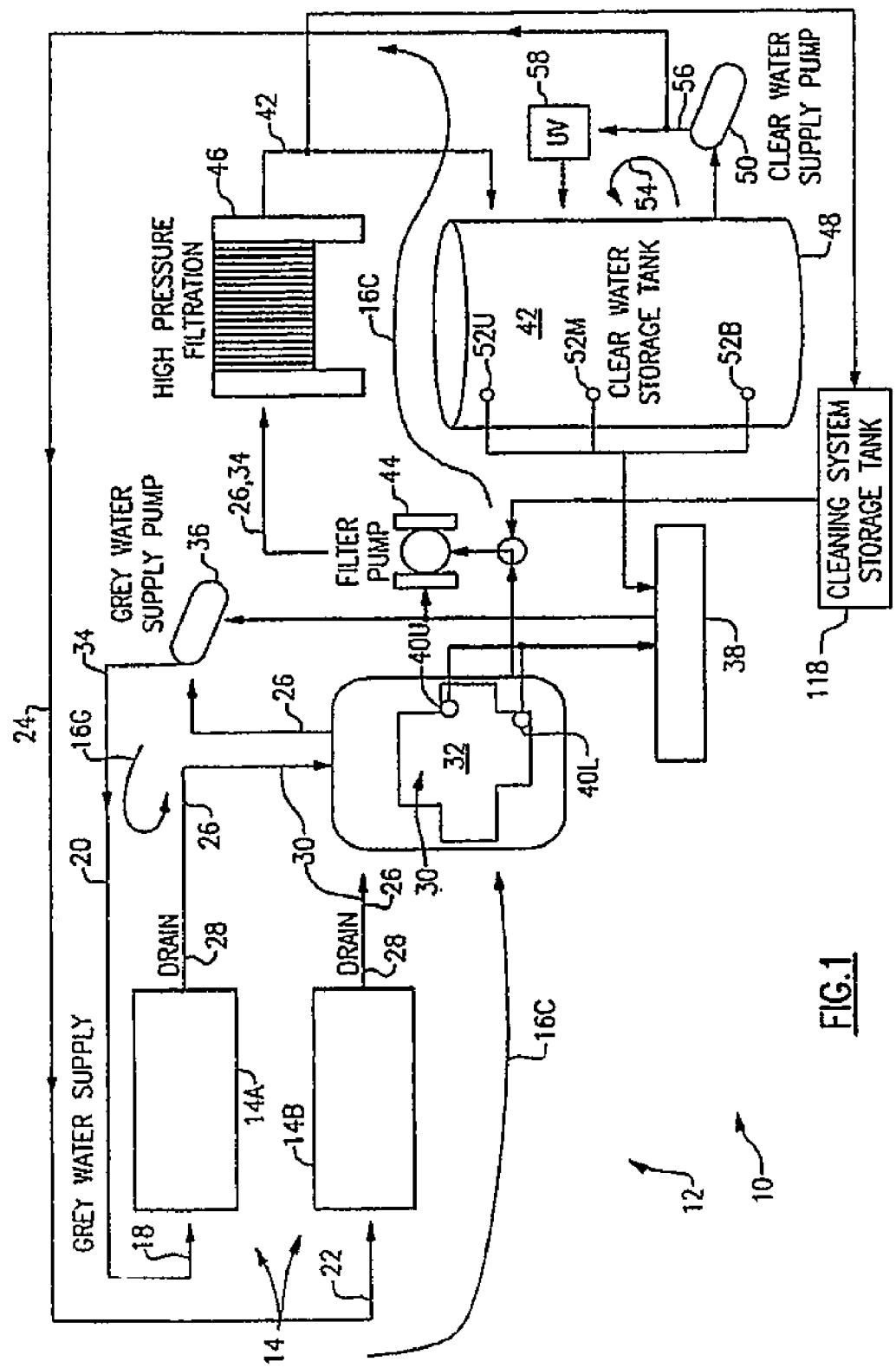

Referring to FIGS. 3A, 3B and 3C, FIG. 3A is a diagrammatic end view of a typical Filter Plate 62, which also illustrates a Head Plate 64 and a Tail Plate 62T, while FIG. 3B is a cross section view of a Filter Stack 60 including a Head Plate 64, Filter Plates 62 and a Tail Plate 62T. FIG. 3C, in turn, is a diagrammatic cross sectional view of Active Filter Elements 102, including a Filter Diaphragm 104 and a Granular Filter Aid Layer 106 for a Filter Plate 62 having back-to-back Filter Chambers 72.

As illustrated in FIG. 3A, therein is shown one Face 76 of a typical Filter Plate 62, which will also be used to illustrate a Head Plate 64 and a Tail Plate 62T. As shown in FIG. 3A, a Filter Plate 62, a Head Plate 64 and an Tail Plate 62T are each comprised of a Plate Body Filter Recess 80 and a Filter Plate 62 has a Filter Recess 80 formed in the central region of each Face 76 face of Plate Body 78. Head Plate 64 and Tail Plate 62T, however, have a Filter Recess 80 in only the Face 76 mating with an adjacent Filter Plate 62, that is, on the Face 76 facing into the Filter Stack 60.

As will be described further below, each Filter Recess 80 forms a Filter Chamber 72 supporting and containing Active Filter Elements 102, as will be described in detail in the following. When a Filter Plate 62 is mated with another Filter Plate 62, therefore, the facing Filter Recesses 80 form back-to-back Filter Chambers 72 having a common input flow path from Input Passage 70 and common output flow paths to Discharge Passages 74. A Filter Plate 62 mated with a Head Plate 64 will have a single Filter Chamber 72, as will Tail Plate 62T as in most embodiments only the Filter Plates 62 will include a double sided Filter Recess 80.

It is necessary to isolate Discharge Passages 74 and the Crystal Clear Water 42 therein from Input Passage 70 and the Waste Water 26 therein and to thereby force Waste Water 26 to pass through the Active Filter Elements 102 to become Crystal Clear Water 42.

For this reason, one Face 76 of each Filter Plate 62 will include a Recess Gasket 80G surrounding the Filter Recess 80 and Discharge Bore Gaskets 84G surrounding the sections of Discharge Passages 74 extending through the Filter Plate 62. Each Recess Gasket 80G and each Discharge Bore Gasket 84G seats against a mating Face 76 of a neighbor Filter Plate 62 or of Tail Plate 62T when Filter Plates 62, Head Plate 64 and Tail Plate 62T are forced together into a water and pressure tight Filter Stack 60.

Each Manifold Plate 64M and each Head Plate 64 will have a Recess Gasket 80G surrounding the single Filter Recess 80 and Discharge Bore Gaskets 84G surrounding the sections of Discharge Passages 74 extending through the Manifold Plate 64M or Head Plate 64 on the Faces 76 of these plates that face into the Filter Stack 60, that is, in the direction of Tail Plate 62T.

Each Face 76 of each Filter Plate 62, Head Plate 64 and Tail Plate 62T having a Filter Recess 80 will also have a Gasket Groove 110 surrounding the Filter Recess 80 in that Face 76 for receiving and securing the Active Filter Elements 102 contained in each Filter Recess 80, as will be discussed further below.

The section of Input Passage 70 formed in each Filter Plate 62, in Head Plate 64, in Tail Plate 62T and in Manifold Plate 64B is formed by an Input Bore 82 located centrally in the Filter Recesses 80 of the plates and the Input Bore 82 of Manifold Plate 64M, Head Plate 64, each Filter Plate 62 and Tail Plate 62T is aligned with the Input Bores 82 of other Filter Plates 62 and of Head Plate 64, Manifold Plate 64M and Tail Plate 62T to form Input Passage 70. In this regard, it must be noted that the Input Bore 82 in Tail Plate 62T does not extend through the Tail Plate 62T as the Input Passage 70 terminates at the Tail Plate 62T.

The sections of Discharge Passages 74 formed in Manifold Plate 64M, Head Plate 64, each Filter Plate 62, and Tail Plate 62T a corresponding plurality of Discharge Bores 84 located circumferentially around the Filter Recess 80 or Filter Recesses 80, and thus concentrically around Input Passage 70. The Discharge Bores 84 in Manifold Plate 64M, Head Plate 64, each Filter Plate 62 and Tail Plate 62T are each aligned with the corresponding Discharge Bores 84 of Manifold Plate 64M, Head Plate 64, other Filter Plates, 62, and Tail Plate 62T to form the corresponding Discharge Passages 74. In the case of an Tail Plate 62T, however, the Discharge Bores 84 do not extend through the Plate Body 78 as the Discharge Passages 74 terminate at the Tail Plate 62T.

As discussed in further detail below, the Active Filter Elements 102 of a Filter Stack 60 extend across and are supported in each Filter Recess 80 of each Filter Chamber 72 so that Waste Water 26 entering through Input Passage 70 flows through the Active Filter Elements 102 to become Crystal Clear Water 42 in Discharge Passages 74. For this reason, each Filter Recess 80, that is, each Filter Chamber 72, in Head Plate 64, in each Filter Plate 62 and in Tail Plate 62T is connected to Discharge Bores 84 through a plurality of Filter Discharge Grooves 86 formed in a Recess Face 88 of each Filter Recess 80 and Filter Discharge Passages 90 connecting the Filter Discharge Passages 86 with Discharge Bores 84. Filter Discharge Passages 86 and Filter Discharge Passages 90 thereby complete the flow path through which Waste Water 26 flows to and into Filter Chambers 72 through Input Passage 70 and Crystal Clear Water 42 flows from Filter Chambers 72 to and through Discharge Passages 74.

It must be noted with respect to Discharge Passages 74 and Filter Discharge Passage 86 that in a presently preferred embodiment of a Filter Stack 60 the sequence of Filter Plates 62 is formed of a sequence of alternating Filter Plates 62A and 62B arranged in the sequence: 62A, 62B, 62A, 62B . . ., and so on. In the presently preferred embodiment, Filter Plates 62A and Filter Plates 62B differ only in that in a Filter Plate 62A the Filter Discharge Passages 90 are connected to the upper and lower Discharge Passages 74 on one side of the Filter Plate 62 while in a Filter Plate 62B the Filter Discharge Passages 90 are connected to the upper and lower Discharge Passages 74 on the opposite side of the Filter Plate 62. As will be discussed further below, this arrangement of alternating connections between the Filter Recesses 80 and Discharge Passages 74 provides improved water flow characteristics and patterns through the Filter Stack 60 during normal filtering operation, during drying of the sludge that accumulates on Active Filter Elements 102, in back-flushing of the Filter Stack 60, and in coating Filter Media 104 coated with a Granular Filter Aid Layer 106, as discussed in further detail in a following discussion. It should be noted that in a plate having two Filter Recesses 80, such as a Filter Plate 62, the Filter Recesses 80 may share common Filter Discharge Passages 90.

It will be recognized and understood by those of ordinary skill in the arts that Filter Discharge Grooves 86 and Filter Discharge Passages 90 may be implemented in a number of alternate ways. For example, the Filter Discharge Grooves 86 of a Filter Chamber 72 may be replaced by a pattern of openings formed in a port plate set into the Filter Recess 80 and supporting the Active Filter Elements 102, thereby forming a space behind the port plate in which the water flowing through the Active Filter Elements 102 is collected before passing to Discharge Passages 84 through Filter Discharge Passages 90.

In another embodiment, and for example, a Filter Plate 62, Tail Plate 62T or Head Plate 64, or all three or any combination thereof, may be a box-like structure comprised of a frame generally forming the outside perimeter of the Filter Plate 62, Tail Plate 62T ro Head Plate 64 and two face plates. In this embodiment, Filter Discharge Grooves 86 would instead be formed by patterns holes in the face plates and the Input Bores 82 and Discharge Bores 84 would be formed by tubular members extending between the face plates, using blank face plates where necessary in the Head Plate 64 and Tail Plate 62T.

Next considering the Active Filter Elements 102 supported by and contained in the Filter Chambers 72, FIG. 3C is a diagrammatic cross sectional view of a Filter Stack 60, including a sequence of Filter Plates 62 forming a midsection portion of a Filter Stack 60, the input/output end section of the Filter Stack 60 including a Manifold Plate 64M, and the closed end section of the Filter Stack 60 including an Tail Plate 62T.

As described herein above, Filter Plates 62 mate face-to-face with other Filter Plates 62 or with a Head Plate 64 or an Tail Plate 62T so that their Input Bores 82 mate to form an Input Passage 70 and their Discharge Bores 84 mate to form Discharge Passages 74 with each Filter Recess 80 forming a Filter Chamber 72. As illustrated in FIG. 3C, each Filter Chamber 72 contains and supports Active Filter Elements 102 of a Filter Stack 60 wherein Active Filter Elements 102 rest upon Recess Face 78 and over Filter Discharge Grooves 86. As described, Active Filter Elements 102 are those elements of High Pressure Filter 46 that capture and filter out the particulate matter as necessary to convert Waste Water 26 into Crystal Clear Water 42 and, according to the present invention, Active Filter Elements 102 include a Filter Media 104 coated with a Granular Filter Aid Layer 106.

In the presently preferred embodiment, the Filter Media 104 for each Filter Chamber 72 is attached to a Face 76 of Head Plate 64, Filter Plate 62 or Tail Plate 62T around the periphery of the Filter Recess 80 by means of a Rope Gasket 108 stitched into the outer circumference of the Filter Media 104 and "force fit" seated into a Gasket Groove 110 in the Face 76 and extending around the periphery of the Filter Recess 80. Filter Media 104 thereby extends across the Filter Recess 80 over Filter Grooves 86 and is attached and sealed to the Face 76 around the Filter Recess 80. As indicated in FIG. 3A, the outer perimeter of Filter Media 104, and thus Rope Gasket 108 and Gasket Groove 110, are octagonal. It will be recognized, however, that the outer perimeter of Filter Media 104 and thus Rope Gasket 108 and Gasket Groove 110 may be of any desired shape, such as circular. It will also be recognized that Rope Gasket 108 may be formed in a number of ways, such as by being woven into the perimeter of Filter Media 104 rather than as an initially separate component stitched into or onto the Filter Membrane 104. Rope Gasket 108 may also be made of any material that has a mass adequate to secure the Filter Media 104 to the plate.

In the case of a Filter Plate 62 with two back-to-back Filter Chambers 72, Filter Media 104 is comprised of two back-to-back Media Plates 112, each forming the section of Filter Media 104 extending across one of the two Filter Recesses 80. As shown, Each Media Plate 112 has a circular Input Bore Opening 114 corresponding to the Input Bore 82 of the Filter Plate 62, and the two Media Plates 112 are connected between the Input Bore Openings 114 by a cylindrical Media Plate Connector 116, so that the Filter Discharge Grooves 86, Filter Discharge Passages 90 and Discharge Bores 84 of each Filter Chamber 72 are completely separated from the Input Passage 70 by the Filter Media 104.

In the case of an Tail Plate 62T or of a Head Plate 64 containing a Filter Chamber 72, there is only one Filter Chamber 72 and the Filter Media 104 is thereby comprised of a single Media Plate 112. In the case of a Tail Plate 62T neither an Input Bore Opening 114 or Media Plate Connector 116 is required as the Input Passage 70 and Discharge Passages 84 terminate at the Tail Plate 62T. In the case of a Head Plate 64, an Input Bore Opening 114 is required. As indicated in FIG. 3C, a hole is cut into the single Media Plate 112 and fitted over a Centering Nipple 64N where a lock nut secures the Media Plate 112 to the Head Plate 64.

In the presently preferred embodiment of the present invention, Filter Medias 104 are preferably comprised of a woven fabric material having an Oxford weave of multifilament yarn made of polypropylene fibers and having a specific weight of approximately 14 oz. per square yard, a thread count of approximately 75×2 per square inch, and a sfm rating of approximately 2–3. The presently preferred filter cloth is manufactured, or stitched, by C. Goodman & Co., Inc. of Paterson, N.J. as style number 42614, and is presently formed into Filter Medias 104 by C. Goodman & Co., Inc. The Filter Medias 104 may typically have diameters in the range of 1 to 6 feet, with the diameters of Filter Medias 104 and the number of Filter Plates 62 in the Filter Stack 60 being dependent on the desired flow volume of Crystal Clear Water 42.

Next referring to Granular Filter Aid Layers 106, the upstream side of each Filter Media 104, that is, the side of each Filter Media 104 towards Input Passage 70, is coated with a Granular Filter Aid Layer 106 comprised of a granular filter material capable of capturing the particulate waste matter present in Waste Water 26. Each Granular Filter Aid Layer 106 thereby performs two functions, one being to aid in the filtration of particulate matter from Waste Water 26, that is, to capture particulate waste matter to prevent the particulate waste matter from reaching the Filter Media 104 itself. The second function is to prevent the particulate waste matter from penetrating the surface of the Filter Media 104 and causing premature "fouling" of the Filter Media 104 that is either captured by the Granular Filter Aid Layer 106 itself or that is stopped from passing through the Filter Mambrane 104 by the Filter Media 104 itself. In this regard, it will be recognized that a primary function of each Filter Media 104 is to support the material of the Granular Filter Aid Layer 106 that coats the Filter Media 104.

Each Granular Filter Aid Layer 106 is comprised of a layer of granular, porous material comprised of amorphous alumina silicate of the form commonly referred to by the trade name "Perlite", which is obtained from the heat treatment expansion of extracts from perlite ore, and having a thickness of approximately 0.1 lbs of Perlite per square foot of Filter Media 104 area. In the present embodiment of Granular Filter Aid Layers 106, the material comprising Granular Filter Aid Layers 106 is comprised of "Perlite" product number H 700 available from Harborlite Corp., which is located in Lompoc, Calif., and which is a perlite products division of World Minerals Inc., which is located in Santa Barbara, Calif.

The material employed in Granular Filter Aid Layers 106 in the presently preferred embodiment of the present invention, that is, "Perlite" product number H 700 from Harborlite Corp., is referred to as Food Codex Grade whole filter aid powder and is comprised of the form of amorphous alimina silicate known by the tradename "Perlite". The material has a density of 11.0 pounds per cubic foot in the packaged form and a density of 13.2 pounds per cubic foot in the cake form, a median particle size of 35.6 microns, a median pore size of 18.1 microns, a specific gravity of 2.3 and a DARCY permeability of 1.24 and a 140 mesh screen retain factor of 8%.

In summary, therefore, Waste Water 26 enters a Filter Stack 60 through Input Passage 70, which is comprised of the Input Bore 82 segments in Head Plate 64 and in each Filter Plate 62 and which connects Filter Chambers 72 such that Waste Water 26 can readily flow through Input Passage 70 from Input Bore 82 of Head Plate 64 into each Filter Chamber 72 along the Input Passage 70 and to the termination of Input Passage 70 at Tail Plate 62T. In each Filter Chamber 72, the Waste Water 26 flows through the Granular Filter Aid Layer 106 and the Filter Media 104 of Active Filter Elements 102, and, as Crystal Clear Water 42, flows through Filter Discharge Grooves 86 and Filter Discharge Passages 90 and into Discharge Bores 84. As described, each Discharge Bore 84 is a segment of a Discharge Passage 74 and Crystal Clear Water 42 thereby flows through Discharge Passages 74 to and through Head Plate 64, where the flow of Crystal Clear Water 42 from the Discharge Passages 74 are combined into a single flow to Crystal Clear Water Storage Tank 48.

The filtering of Waste Water 26 into Crystal Clear Water 42 will result in the accumulation of particulate waste matter filtered from the Waste Water 26 in each of the Granular Filter Aid Layers 106 and a deposit of some particulate waste material on each Filter Media 104. The buildup of "sludge" in each Granular Filter Aid Layer Granular Filter Aid Layers 106 and on each Filter Media 104 will result in a gradually increasing backpressure in the Filter Stack 60 until the flow of Waste Water 26 into Filter Stack 60 and the flow rate of Crystal Clear Water 42 from Filter Stack 60 is reduced to a level below that which is desired. At this point it is necessary to clean the "sludge" from Filter Stack 60.

A Filter Stack 60 is cleaned by first forcing air into the Filter Stack 60 through one of the upper Discharge Passages 74 in the reverse direction of the normal flow, whereupon the air will flow into passages and chambers of the Filter Plates 62, Head Plaate 64 and Tail Plate 62T and will force water from the sludge deposit in Granular Filter Layers 106 and the Filter Media 104 and out the lower Discharge Passage 74 connected to the Filter Chamber 72, which is left open for this purpose. The forcing of water out of the sludge deposit in Granular Filter Layers 106 and Filter Medias 104 will transform the sludge from a watery mud into a dryer and more solid deposit that is more manageable than the original watery sludge, which would typically drop off the Filter Medias 104 as soon as the Filter Stack 60 is opened. The air is forced into one or both upper Discharge Passages 74 through an air connection fitting connecting to a selected Discharge Passage 74. In a presently preferred embodiment, however, the air fitting is connected into Manifold Plate 64M and through Manifold Plate 64M to one or more Discharge Passages 74 through an air fitting mounted on Manifold Plate 64M separate from Discharge Passages 74.

The pressure exerted by Hydraulic Ram 66 on Push Plate 68 and thereby on Tail Plate 62T, Filter Plates 62, End Plate 64 and Manifold Plate 64M is then released so that Filter Plates 62 and Tail Plate 62T can be separated and removed by means of the Plate Handles 78H located on each side of each Plate Body 78. The Granular Filter Aid Layer 106, the granular material of which contains and is now a part of the sludge on each Filter Media 104, is then scraped off of each Filter Media 104 and the Filter Medias 104 are washed with a high pressure hose spray to remove the last of the sludge layer and any particulate waste matter caught in the fabric of the Filter Medias 104. This process is normally performed on Head Plate 64 "in place" as Head Plate 64 is typically permanently mounted onto Frame 58 adjacent to Manifold Plate 64M.

The Filter Plates 62 and Tail Plate 62T are then reassembled into the Filter Stack 60 and the pressure exerted by Hydraulic Ram 66 is restored to force the Tail Plate 62T and the Filter Plates 62 into contact with each other and with Head Plate 64 and Manifold Plate 64M to form the air and pressure tight Filter Stack 60. Crystal Clear Water 42 is then pumped from a Cleaning System Storage Tank 118 and through the Filter Stack 60 in the normal direction of flow from Input Passage 70 to Discharge Passages 74 until all residual particulate matter is washed from the Discharge Passages 74.

It will be apparent that, at this stage, and while the Filter Stack 60 is cleaned, reassembled and flushed, there are no Granular Filter Layers 106 coating the Filter Medias 104, and that the Granular Filter Layers 106 must be pre-coated onto the Filter Medias 104 before use of the Filter Stack 60.

The pre-coating of Granular Filter Layers 106 onto the Filter Medias 104 is accomplished by connecting the Cleaning System Storage Tank 118 of crystal clear water to Input Passage 70 through Air Pump 44, with the Discharge Passages 74 being returned back to Cleaning System Storage Tank 118. The volume of crystal clear water in Cleaning System Storage Tank 118 is dependent upon the capacity of the Filter Stack 60 and should be sufficient to fill the Filter Stack 60, to fill the piping between the Cleaning System Storage Tank 118 and Filter Stack 60, including the capacity of Air Pump 44, and an additional margin in Cleaning System Storage Tank 118. It should also be noted that Cleaning System Storage Tank 118 may be, for example, a barrel, tank or "pit".

The crystal clear water in Cleaning System Storage Tank 118 is then "charged" with a quantity of the material comprising the Granular Filter Layers 106, which will be used to pre-coat the Filter Media 104, with the volume of pre-coat material being dependent on the square footage of Filter Media 104 contained in Filter Stack 60. The mixture of crystal clear water and pre-coat material is then pumped into Input Passage 70 and crystal clear water will flow out of Discharge Passages 74 and back to Cleaning System Storage Tank 118 while the pre-coat material is filtered out of the water by each Filter Media 104, thereby forming the Granular Filter Aid Layer 106 on each Filter Media 104. This process may be repeated as necessary with successive charges of the pre-coat material being added to the water until the necessary thickness of Granular Filter Aid Layer 106 is deposited on each Filter Media 104, which as described is on the order of 0.1 lb of pre-coat material per each square foot of area of the Filter Media 104 in the Filter Stack 60. Water continues to "recirculate" through the Cleaning System Storage Tank 118 until all pre-coat material has been removed by being deposited on Filter Media 104, and the Filter Stack 60 will then be ready for use.

As described herein above, a typical implementation of a presently preferred embodiment of a High Pressure Filter will include one Tail Plate 62T, one Head Plate Plate 64 mounted rigidly to Frame 58, wherein Frame 58 includes Manifold Plate 64M mounted on Frame 58, several Filter Plates 62 which are mounted into Frame 58, and the Hydraulic Ram 66, which is attached between Frame 58 and Push Plate 68. Filter Plates 62 and Filter Medias 104 may be between 1 and 6 feet across and approximately 2 to 4 inches thick, while the single Input Passage 70 and Discharge Passages 74, of which there are typically 4, may range from 1 to 3 inches in diameter.

Since certain changes may be made in the above described method and system without departing from the spirit and scope of the invention herein involved, it is intended that all of the subject matter of the above description or shown in the accompanying drawings shall be interpreted merely as examples illustrating the inventive concept herein and shall not be construed as limiting the invention.

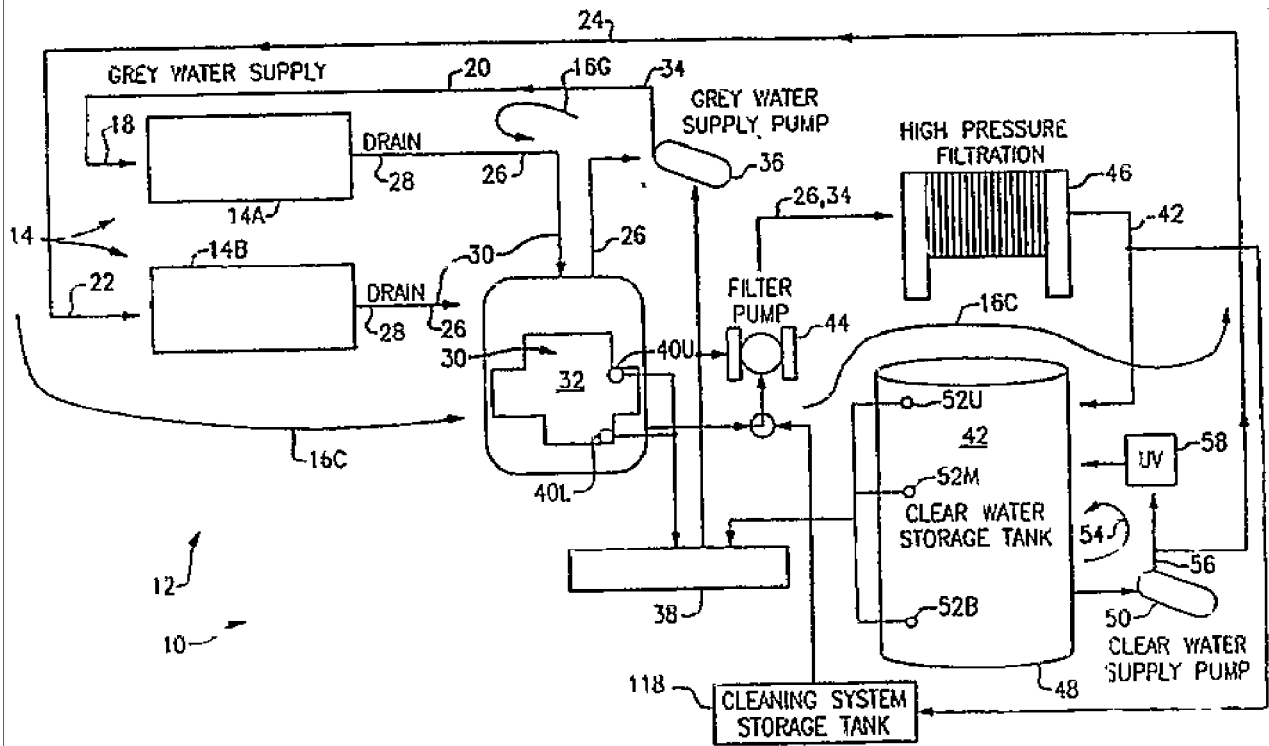

What is claimed is:

1. A water treatment and recycling system for use in providing grey water and clear water to a stone processing system including crystal clear water stone fabrication equipment requiring crystal clear water for operations on stone and grey water stone fabrication equipment capable of using grey water in for operations on stone, comprising:

a waste water storage tank connected from the waste water discharge ports of the grey water equipment and of the crystal clear water stone fabrication equipment for receiving and storing the waste water, a grey water supply loop, including
a grey water pump connected from the waste water storage tank for pumping waste water from the waste water storage tank as grey water to an input port of a grey water tool, and a crystal clear water supply loop, including
an air pump for pumping waste water from the waste water storage tank,
a high pressure filter connected from the filter pump for filtering particulate matter from the waste water to convert the waste water into the crystal clear water,
a crystal clear water storage tank connected from discharge passages of the high pressure filter for receiving and storing the crystal clear water, and
a crystal clear water supply pump connected from the crystal clear water storage tank for pumping crystal clear water from the crystal clear water storage tank and to an input port of a crystal clear water tool.

2. The water treatment and recycling system of claim 1, further comprising:

a crystal clear water sterilization loop, including
a sterilization device connected from an output port of the crystal clear water supply pump for receiving and sterilizing at least a portion of the crystal clear water stored in the crystal clear water storage tank and connected to an input port of the crystal clear water storage tank for returning the sterilized crystal clear water to the crystal clear water storage tank.

3. The water treatment and recycling system of claim 1, further comprising:

a plurality of float switches mounted at selected levels in the waste water storage tank and in the crystal clear water storage tank for indicating waste water levels in the waste water storage tank and crystal clear water levels in the crystal clear water storage tank, and control circuits connected from the float switches in the waste water storage tank and in the crystal clear water storage tank and from a use control panel and proving control outputs to the grey water supply pump, the filter pump and the crystal clear water supply pump for enabling operation of the grey water supply pump, the filter pump and the crystal clear water supply pump dependent on the waste water level in the waste water storage tank and the crystal clear water level in the crystal clear water storage tank.

4. The water treatment and recycling system of claim 1 wherein the high pressure filter comprises:

a frame holding a filter stack including a head plate, a plurality of filter plates, an tail plate and a ram for applying axial pressure along the filter stack to force the head plate, the filter plates and the tail plate into a pressure tight assembly, the head plate and each of the filter plates including an axial input bore connecting sequentially along the filter stage to form an axial input passage for receiving waste water from the waste water storage tank, and a plurality of discharge bores located circumferentially around the axial input passage to form a corresponding plurality of discharge passages extending along the length of the filter stack, the discharge passages being connected to one another outside of the head plate and to the crystal clear water storage tank, and each of the filter plates further including at least one filter chamber for containing and supporting active filter elements, each filter chamber being connected between the axial input passage and each of the plurality of discharge passages and the active filter elements removing particulate matter from the waste water flowing along the input passage to provide the crystal clear water discharged through the discharge passages, and the tail plate being located at the opposite end of the filter stack from the head plate and terminating the input passage and the discharge passages.

5. The water treatment and recycling system of claim 4, wherein the active filter elements comprise:

a filter Media extending across a filter chamber in a flow path between the input passage and the discharge passages communicating with the filter chamber, and a granular filter layer coated upon and supported by the filter Media for removal of particulate matter from the waste water, the granular filter layer being located in the flow path from the input passage to the discharge passages on the input passage side of the filter Media.

6. The water treatment and recycling system of claim 4, further comprising:

in each filter plate, a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

7. A high pressure filter for removing particulate matter from waste water from at least one stone processing tool and providing crystal clear water to at least one stone processing tool, comprising:

a filter frame holding a filter stack including a head plate, a plurality of filter plates, an tail plate and a ram for applying axial pressure along the filter stack to force the head plate, the filter plates and the tail plate into a pressure tight assembly, the head plate and each of the filter plates including an axial input bore connecting sequentially along the filter stage to form an axial input passage for receiving waste water from the waste water storage tank, and a plurality of discharge bores located circumferentially around the axial input passage to form a corresponding plurality of discharge passages extending along the length of the filter stack, the discharge passages being connected to one another outside of the head plate and to the crystal clear water storage tank, and each of the filter plates further including at least one filter chamber for containing and supporting active filter elements, each filter chamber being connected between the axial input passage and each of the plurality of discharge passages and the active filter elements removing particulate matter from the waste water flowing along the input passage to provide the crystal clear water discharged through the discharge passages, and the tail plate being located at the opposite end of the filter stack from the head plate and terminating the input passage and the discharge passages.

8. The high pressure filter of claim 7, wherein the active filter elements comprise:

a filter Media extending across a filter chamber in a flow path between the input passage and the discharge passages communicating with the filter chamber, and a granular filter layer coated upon and supported by the filter Media for removal of particulate matter from the waste water, the granular filter layer being located in the flow path from the input passage to the discharge passages on the input passage side of the filter Media.

9. The high pressure filter of claim 7, further including:

in each filter plate, a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

10. A method for supplying grey water and crystal clear water to a stone processing system including crystal clear water stone fabrication equipment requiring crystal clear water for operations on stone and grey water stone fabrication equipment capable of using grey water in for operations on stone, comprising the steps of:

receiving and storing waste water from waste water discharge ports of the grey water equipment and of the crystal clear water stone fabrication equipment in a waste water storage tank, providing grey water to an input port of a grey water tool through a grey water supply loop, pumping waste water from the waste water storage tank and to an input port of a grey water tool as grey water, and providing crystal clear water to the crystal clear water stone fabrication equipment through a crystal clear water loop by pumping waste water from the waste water storage tank and to a high pressure filter, filtering the waste water into crystal clear water by filtering particulate matter from the waste water in the high pressure filter, receiving and storing the crystal clear water from the high pressure filter in a crystal clear water storage tank, and pumping crystal clear water from the crystal clear water storage tank and to an input port of a crystal clear water tool.

11. The method of claim 10, further comprising the steps of:

diverting at least a portion of the crystal clear water stored in the crystal clear water storage tank through a sterilization device connected from an output port of the crystal clear water supply pump, and returning the sterilized crystal clear water to the crystal clear water storage tank.

12. The method of claim 10, further comprising the steps of:

sensing the waste water level in the waste water storage tank and the crystal clear water level in the crystal clear water storage tank by means of a plurality of float switches mounted at selected levels in the waste water storage tank and in the crystal clear water storage tank, and generating control outputs to the grey water supply pump, the filter pump and the crystal clear water supply pump to enable operation of the grey water supply pump, the filter pump and the crystal clear water supply pump dependent on the level of waste water in the waste water storage tank, the level of crystal clear water in the crystal clear water storage tank, and user inputs from a control panel.

13. The method of claim 10, further including the preliminary steps of:

assembling a filter stack including a head plate, a plurality of filter plates and an tail plate in a filter frame, applying axial pressure along the filter stack to force the head plate, the filter plates and the tail plate into a pressure tight assembly, supplying waste water under pressure into a waste water input passage of the filter stack wherein the head plate and each of the filter plates include
an axial input bore connecting sequentially along the filter stage to form an axial waste water input passage for receiving waste water from the waste water storage tank, and passing the waste water through each of at least one filter chamber in each of the filter plates,
each filter chamber containing and supporting active filter elements for removing particulate matter from the waste water to convert the waste water into crystal clear water, each filter chamber being connected between the axial waste water input passage and each of a plurality of discharge passages,
collecting the crystal clear water in each of the discharge passages and passing the crystal clear water in the discharge passages through the head plate and to an input port of the crystal clear water storage tank, wherein the head plate includes a waste water input port connected from and waste water storage tank and to the input passage of the filter stack and a plurality of discharge ports, each discharge port being connected to a corresponding discharge passage of the filter stack, and the tail plate being located at the opposite end of the filter stack from the head plate and terminating the input passage and the discharge passages.

14. The method of claim 13, wherein the active filter elements include:

in each filter plate,
a filter Media extending across a filter chamber in a flow path between the input passage and the discharge passages communicating with the filter chamber, and a granular filter layer coated upon and supported by the filter Media for removal of particulate matter from the waste water, the granular filter layer being located in the flow path from the input passage to the discharge passages on the input passage side of the filter Media.

15. The method of claim 13, wherein each filter plate includes:

a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

16. A method of removing particulate matter from waste water from at least one stone processing tool and providing crystal clear water to at least one stone processing tool, comprising the steps of:

receiving and storing waste water from waste water discharge ports of the at least one stone processing tool in a waste water storage tank, pumping waste water from the waste water storage tank and to a high pressure filter under pressure,
filtering the waste water into crystal clear water by filtering particulate matter from the waste water in the high pressure filter, receiving and storing the crystal clear water from the high pressure filter in a crystal clear water storage tank, and pumping crystal clear water from the crystal clear water storage tank and to an input port of a stone processing tool, wherein the high pressure filter includes a filter stack including a head plate, a plurality of filter plates and an tail plate, wherein the head plate and each of the filter plates include
an axial input bore connecting sequentially along the filter stage to form an axial input passage for receiving waste water from the waste water storage tank, and a plurality of discharge bores located circumferentially around the axial input passage to form a corresponding plurality of discharge passages extending along the length of the filter stack, the discharge passages being connected to one another outside of the head plate and to the crystal clear water storage tank, and the tail plate is located at the opposite end of the filter stack from the head plate and terminating the input passage and the discharge passages.

17. The method of claim 16, wherein the active filter elements comprise:

a filter Media extending across a filter chamber in a flow path between the input passage and the discharge passages communicating with the filter chamber, and a granular filter layer coated upon and supported by the filter Media for removal of particulate matter from the waste water, the granular filter layer being located in the flow path from the input passage to the discharge passages on the input passage side of the filter Media.

18. The method of claim 16, wherein:
each filter plate includes,
a filter chamber gasket circumferentially surrounding at least one filter chamber to seal the at least one filter chamber to a next sequential one of a filter plate, the head plate and the tail plate, and
a discharge bore gasket circumferentially surrounding each discharge bore on one face of the filter plate to seal each discharge bore to a next sequential one of a filter plate, the head plate and the tail plate.

19. The method of claim 16, further including a method for cleaning the filter stack of accumulated waste particulate matter, comprising the steps of:
forcing air into the filter stack through a discharge passage to force air to flow through the filter chambers and the active filter elements to and through the input passage to force water from particulate waste matter captured by the active filter elements,
releasing axial pressure on the filter stack to permit separation of the head plate, the filter plates and the tail plate,
scraping the particulate waste matter captured by the active filter elements and a granular filter layer containing the captured particulate waste matter from the surface of a filter Media,
flushing captured particulate waste matter from the surface of the filter Media by means of a high pressure water hose system,
reassembling the head plate, the filter plates and the tail plate into a filter stack and restoring the axial pressure on the head plate, the filter plates and the tail plate to force the filter stack into a pressure tight assembly,
flushing crystal clear water through the filter stack in a reverse direction to flush residual waste matter from the filter stack by forcing crystal clear water into the discharge passages to flow through the filter plates and out the input passage, and
restoring the granular filter layer coating to each filter Media.

20. The method of claim 19 further including a method for coating a granular filter layer onto each filter Media, comprising the steps of:
pumping a mixture of crystal clear water and a granular material comprising the granular filter layer into the input passage of the filter stack to flow through each filter Media of each filter plate and through the discharge passages from the filter stack, and
recirculating the crystal clear water returned from the discharge passages of the filter stack and replenishing the granular material mixed into the crystal clear water until a desired thickness of the granular material is deposited on the each filter Media of each filter plate.

21. The method of claim 10 wherein each filter plate includes a filter Media coated with a granular filer layer for filtering the particulate waste matter from the waste water to convert the waste water into crystal clear water, further comprising a method for depositing a granular filter layer on each filter Media, comprising the steps of:
pumping a mixture of crystal clear water and a granular material comprising the granular filter layer into the input passage of the filter stack to flow through each filter Media of each filter plate and through the discharge passages from the filter stack, and
recirculating the crystal clear water returned from the discharge passages of the filter stack and replenishing the granular material mixed into the crystal clear water until a desired thickness of the granular material is deposited on the each filter Media of each filter plate.

* * * * *

UNITED STATES PATENT AND TRADEMARK OFFICE
CERTIFICATE OF CORRECTION

PATENT NO. : 6,896,818 B2  
APPLICATION NO. : 10/650187  
DATED : May 24, 2005  
INVENTOR(S) : Perry et al.

It is certified that error appears in the above-identified patent and that said Letters Patent is hereby corrected as shown below:

On The Title Page and sheets 1-4

Fig. 1; Fig. 2; Fig. 3A; Fig. 3B are replaced with the attached sheets consisting of Figs. 1-3B.

Column 1,

Line 13, "on siteseptic" should be --on-site septic--.

Column 2,

Lines 7 and 8, "equipments" should be --equipment--.

Line 21, "effect" should be --affect--.

Column 3,

Line 5, "water in" should be --water--.

Line 24, "tank and" should be --tank--.

Column 4,

Line 32, "waster water" should be -- waste water--.

Column 6,

Line 30, "14A" should be --14--.

Line 61, "40" should be --40U--.

Line 65, "40" should be --40U--.

Column 7,

Line 9, "40" should be --40U--.

Lines 66-67, "Switches 40U and 40L" should be --Switch 40L--.

Column 8,

Line 9, "40U and 40L" should be --40U--.

Line 27, "dear" should be --clear--.

Line 59, "52" should be --52M--.

Column 10,

Line 21, "an" should be --a--.

Column 11,

Line 66, "arts" should be --art--.

UNITED STATES PATENT AND TRADEMARK OFFICE
CERTIFICATE OF CORRECTION

PATENT NO.        : 6,896,818 B2
APPLICATION NO.   : 10/650187
DATED             : May 24, 2005
INVENTOR(S)       : Perry et al.

It is certified that error appears in the above-identified patent and that said Letters Patent is hereby corrected as shown below:

Column 12,

Line 13, "ro" should be --or--.

Line 15, "patterns" should be --pattern--.

Line 30, "an" should be --a--.

Column 13,

Line 12, "an" should be --a--.

Column 16,

Line 15, "or" should be --as--.

Line 38, "filter" should be --air--.

Line 59, "the sterilized" should be --sterilized--.

Column 17,

Line 3, "proving" should be --providing--.

Line 4, "filter" should be --air--.

Line 7, "filter" should be --air--.

Line 13, "an tail" should be --a tail--.

Line 67, "an tail" should be --a tail--.

Column 18,

Line 52, "in for" should be --for--.

Column 19,

Line 16, "returning the" should be --returning--.

Line 27, "filter pump" should be --air pump--.

Line 29, "filter pump" should be --air pump--.

Line 37, "an tail" should be --a tail--.

Line 63, "from and" should be --from the--.

Column 20,

Line 46, "an tail" should be --a tail--.

UNITED STATES PATENT AND TRADEMARK OFFICE
CERTIFICATE OF CORRECTION

| | |
|---|---|
| PATENT NO. | : 6,896,818 B2 |
| APPLICATION NO. | : 10/650187 |
| DATED | : May 24, 2005 |
| INVENTOR(S) | : Perry et al. |

It is certified that error appears in the above-identified patent and that said Letters Patent is hereby corrected as shown below:

Column 21,

Line 32, "from the" should be --from a--.

Column 22,

Line 22, "on the each" should be --on each--.

Line 23, "claim 10", should be --claim 19--.

Signed and Sealed this

Twenty-sixth Day of December, 2006

JON W. DUDAS
*Director of the United States Patent and Trademark Office*

United States Patent
Perry et al.

(10) Patent No.: US 6,896,818 B2
(45) Date of Patent: May 24, 2005

(54) WATER FILTRATION AND RECYCLING FOR STONE FABRICATION EQUIPMENT

(75) Inventors: Ross E. Perry, Exeter, NH (US); Paula K. Perry, Exeter, NH (US)

(73) Assignee: PKP Revocable Trust, Portsmouth, NH (US)

(*) Notice: Subject to any disclaimer, the term of this patent is extended or adjusted under 35 U.S.C. 154(b) by 40 days.

(21) Appl. No.: 10/650,187

(22) Filed: Aug. 28, 2003

(65) Prior Publication Data
US 2005/0045565 A1 Mar. 3, 2005

(51) Int. Cl.$^7$ ............... B01D 25/12; B01D 37/02
(52) U.S. Cl. ............... 210/744; 210/777; 210/791; 210/805; 210/97; 210/195.1; 210/351; 210/488
(58) Field of Search ............... 210/744, 777, 210/791, 805, 97, 194, 195.1, 251, 351, 416.1, 488; 451/65

(56) References Cited

U.S. PATENT DOCUMENTS

| 2,594,318 A | * | 4/1952 | Teale | 210/231 |
| 4,597,868 A | * | 7/1986 | Watanabe | 210/232 |
| 5,013,461 A | * | 5/1991 | Drori | 210/777 |
| 5,106,493 A | * | 4/1992 | McIntosh | 210/100 |
| 5,409,616 A | * | 4/1995 | Garbutt et al. | 210/760 |
| 5,447,642 A | * | 9/1995 | Schenach | 210/774 |
| 6,428,709 B1 | * | 8/2002 | Tsuihiji et al. | 210/739 |

FOREIGN PATENT DOCUMENTS

| JP | 06-170835 A | * | 6/1994 |
| JP | 08-187726 A | * | 7/1996 |
| WO | WO 200162362 A1 | * | 8/2001 |

* cited by examiner

Primary Examiner—Frank M. Lawrence
(74) Attorney, Agent, or Firm—Davis & Bujold, P.L.L.C.

(57) ABSTRACT

A water treatment and recycling system to provide grey water and crystal clear water to a stone processing system including crystal clear water stone fabrication equipment requiring crystal clear water and grey water stone fabrication equipment capable of using grey water. The system includes a waste water storage tank connected from the waste water discharge ports of the crystal clear water and grey water stone fabrication equipment, a grey water supply loop for pumping waste water from the waste water storage tank as grey water to the grey water stone fabrication equipment and a crystal clear water supply loop for pumping waste water through a high pressure filter to convert the waste water into the crystal clear water, and a crystal clear water supply pump for pumping crystal clear water to crystal clear water stone fabrication equipment. The high pressure filter includes a frame holding a filter stack.

21 Claims, 5 Drawing Sheets